US008841993B2

(12) United States Patent
Aunkofer et al.

(10) Patent No.: US 8,841,993 B2
(45) Date of Patent: Sep. 23, 2014

(54) CONTROLLER FOR WIRELESS COMMUNICATION WITH A PERIPHERAL UNIT

(75) Inventors: Markus Aunkofer, Abensberg (DE); Thomas Reisinger, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 691 days.

(21) Appl. No.: 12/530,038

(22) PCT Filed: Mar. 4, 2008

(86) PCT No.: PCT/EP2008/052587
§ 371 (c)(1),
(2), (4) Date: Jan. 5, 2010

(87) PCT Pub. No.: WO2008/107430
PCT Pub. Date: Sep. 12, 2008

(65) Prior Publication Data
US 2010/0148986 A1 Jun. 17, 2010

(30) Foreign Application Priority Data
Mar. 6, 2007 (DE) .......................... 10 2007 010 888

(51) Int. Cl.
*B60R 25/10* (2013.01)
*B60C 23/04* (2006.01)
*H04B 1/00* (2006.01)
*G07C 5/00* (2006.01)
*G07C 9/00* (2006.01)

(52) U.S. Cl.
CPC .......... *H04B 1/0067* (2013.01); *B60C 23/0444* (2013.01); *G07C 2209/61* (2013.01); *G07C 2009/00793* (2013.01); *B60C 23/044* (2013.01); *B60C 23/0433* (2013.01); *B60C 23/0418* (2013.01); *G07C 5/008* (2013.01); *B60C 23/0438* (2013.01)

USPC .................................................. 340/426.16

(58) Field of Classification Search
USPC ......... 340/825.1, 5.64, 539.1, 426.16, 539.11
See application file for complete search history.

(56) References Cited

U.S. PATENT DOCUMENTS 4,888,763 A * 12/1989 Hatfield et al. ............... 370/445
5,239,688 A * 8/1993 Dorrie et al. .................... 455/83

(Continued)

FOREIGN PATENT DOCUMENTS

DE    10233597 A1    2/2004
EP     1187346 A2    3/2002

(Continued)

OTHER PUBLICATIONS

International Search Report, PCT/EP2006/052587, 10 pages, Jun. 17, 2008.

(Continued)

*Primary Examiner* — Jennifer Mehmood
*Assistant Examiner* — Rufus Point
(74) *Attorney, Agent, or Firm* — King & Spalding L.L.P.

(57) ABSTRACT

Controller for a motor vehicle for wireless communication with a least one peripheral unit with a least one receiver unit (1) for receiving radio signals for standard applications and at least one receiver unit (2) for receiving radio signals for long-range applications which are emitted by the peripheral unit at different frequencies for the standard applications and the long-range applications. With a least one antenna (ANT1) for one of the two receiver units (1, 2) respectively and with a control unit (4) for controlling the two receiver units (1, 2) as well as for evaluating signals from the two receiver units (1, 2).

26 Claims, 9 Drawing Sheets

|  | EC | US | Japan | Korea | China |
|---|---|---|---|---|---|
| Standard | 434/868 MHz<br>ERC Rec 70-03<br>10 dBm/14 dBm | 315 MHz<br>FCC Part 15.231b<br>-25.6...-5.6 dBm<br>(6042µV ? 3m, up to 20 dB averaging) | 315 MHz<br>Low Power<br>-47.25 dBm<br>(up to -5 dBm?) | 315 MHz<br>Low Power<br>-47.25 dBm | 315/434 MHz<br>Micropower Radio Equipment (XI)<br>10 dBm |
| Long-Range | 868 MHz<br>ERC Rec. 70-03<br>+14 dBm<br>subband f/h<br>ERC Rec. 70-03<br>+27 dBm<br>subband i<br>(25 kHz channels) | ~902 MHz<br>FCC Part 15.249a<br>-7.25 dBm<br>(50m V/m ? 3m,)<br>FCC Part 15.247b<br>+30 dBm<br>(1 Watt for<br>-DSSS>500 kHz BW<br>-FH with min. 50 channels) | 426/429 MHz<br>ARIB STD-T67 426 MHz<br>0 dBm to antenna input<br>(25 kHz channels)<br>ARIB STD-67 429 MHz<br>+10 dBm to antenna input<br>(12.5 kHz channels) | 447 MHz<br>Korea RRL<br>+7 dBm to antenna input (12.5 kHz channels) | 434 MHz<br>Micropower Radio Equipment (XI)<br>+10 dBm |

(56) References Cited

U.S. PATENT DOCUMENTS

| | | | |
|---|---|---|---|
| 5,325,403 A * | 6/1994 | Siwiak et al. | 375/347 |
| 5,565,858 A * | 10/1996 | Guthrie | 340/10.33 |
| 5,661,651 A * | 8/1997 | Geschke et al. | 701/88 |
| 6,091,343 A * | 7/2000 | Dykema et al. | 340/13.21 |
| 6,154,145 A * | 11/2000 | Talbot | 340/5.2 |
| 6,396,823 B1 * | 5/2002 | Park et al. | 370/335 |
| 6,529,746 B1 * | 3/2003 | Kotzin | 455/562.1 |
| 6,552,649 B1 | 4/2003 | Okada et al. | 340/5.61 |
| 6,603,388 B1 * | 8/2003 | Perraud et al. | 340/5.61 |
| 6,604,415 B2 * | 8/2003 | Imao et al. | 73/146.5 |
| 6,710,708 B2 * | 3/2004 | McClelland et al. | 340/442 |
| 6,714,760 B2 * | 3/2004 | Robinett | 455/3.02 |
| 6,747,545 B2 * | 6/2004 | Nowottnick et al. | 340/5.61 |
| 6,768,457 B2 * | 7/2004 | Lindenmeier | 342/374 |
| 6,917,328 B2 * | 7/2005 | Rabinowitz et al. | 342/357.29 |
| 7,046,119 B2 * | 5/2006 | Ghabra et al. | 340/5.72 |
| 7,434,731 B2 * | 10/2008 | Cargonja et al. | 235/380 |
| 7,580,696 B2 * | 8/2009 | Ghabra et al. | 455/352 |
| 7,659,812 B2 * | 2/2010 | Yegin et al. | 340/447 |
| 7,692,529 B2 * | 4/2010 | Hagl et al. | 340/5.61 |
| 7,778,186 B2 * | 8/2010 | Oman et al. | 340/5.61 |
| 7,868,745 B2 * | 1/2011 | Schmidt et al. | 340/426.16 |
| 7,986,960 B2 * | 7/2011 | Ghabra et al. | 455/522 |
| 8,164,416 B2 * | 4/2012 | Lee et al. | 340/5.6 |
| 2002/0177406 A1 | 11/2002 | Desai et al. | |
| 2003/0035437 A1 * | 2/2003 | Garahi et al. | 370/465 |
| 2004/0113765 A1 * | 6/2004 | Suitsu | 340/445 |
| 2005/0206512 A1 * | 9/2005 | Delaporte | 340/442 |
| 2006/0100000 A1 * | 5/2006 | Marples et al. | 455/574 |
| 2006/0129308 A1 * | 6/2006 | Kates | 701/200 |
| 2006/0279467 A1 * | 12/2006 | LeMense et al. | 343/711 |
| 2007/0090967 A1 * | 4/2007 | Zuccotti et al. | 340/825.69 |
| 2007/0155344 A1 * | 7/2007 | Wiessner et al. | 455/78 |
| 2007/0171854 A1 * | 7/2007 | Chen et al. | 370/328 |
| 2008/0084346 A1 * | 4/2008 | Minichshofer et al. | 342/118 |
| 2008/0139118 A1 * | 6/2008 | Sanguinetti | 455/41.2 |
| 2008/0164984 A1 * | 7/2008 | Sheffer | 340/426.13 |
| 2008/0174446 A1 * | 7/2008 | Ghabra et al. | 340/825.01 |
| 2009/0017756 A1 * | 1/2009 | Tsfaty et al. | 455/41.2 |
| 2009/0189801 A1 * | 7/2009 | Forstner et al. | 342/175 |
| 2009/0256674 A1 * | 10/2009 | Lee et al. | 340/5.6 |

FOREIGN PATENT DOCUMENTS

| | | | |
|---|---|---|---|
| EP | 1316485 A2 | 6/2003 | |
| JP | 10141187 A | 5/1998 | B60R 25/00 |
| JP | 2000073635 A | 3/2000 | B60R 25/00 |
| JP | 2004320309 A | 11/2004 | H04B 1/40 |
| JP | 2006044447 A | 2/2006 | B60Q 1/52 |
| JP | 2006298027 A | 11/2006 | B60R 25/00 |

OTHER PUBLICATIONS

German Office Action, German application No. 10 2007 010 888.7-35, 4 pages, Aug. 8, 2007.

* cited by examiner

FIG 1

|  | EC | US | Japan | Korea | China |
|---|---|---|---|---|---|
| Standard | 434/868 MHz<br>ERC Rec 70-03<br>10 dBm/14 dBm | 315 MHz<br>FCC Part 15.231b<br>-25.6...-5.6 dBm<br>(6042μV ? 3m, up to 20 dB averaging) | 315 MHz<br>Low Power<br>-47.25 dBm<br>(up to -5 dBm?) | 315 MHz<br>Low Power<br>-47.25 dBm | 315/434 MHz<br>Micropower Radio Equipment (XI)<br>10 dBm |
| Long-Range | 868 MHz<br>ERC Rec. 70-03<br>+14 dBm subband f/h<br>ERC Rec. 70-03<br>+27 dBm subband i<br>(25 kHz channels) | ~902 MHz<br>FCC Part 15.249a<br>-7.25 dBm<br>(50m V/m ? 3m,)<br>FCC Part 15.247b<br>+30 dBm<br>(1 Watt for<br>-DSSS >500 kHz BW<br>-FH with min. 50 channels) | 426/429 MHz<br>ARIB STD-T67 426 MHz<br>0 dBm to antenna input<br>(25 kHz channels)<br>ARIB STD-67 429 MHz<br>+10 dBm to antenna input<br>(12.5 kHz channels) | 447 MHz<br>Korea RRL<br>+7 dBm to antenna input (12.5 kHz channels) | 434 MHz<br>Micropower Radio Equipment (XI)<br>+10 dBm |

CONTROLLER FOR WIRELESS COMMUNICATION WITH A PERIPHERAL UNIT

CROSS-REFERENCE TO RELATED APPLICATIONS

This application is a U.S. National Stage Application of International Application No. PCT/EP2008/052587 filed Mar. 4, 2008, which designates the United States of America, and claims priority to German Application No. 10 2007 010 888.7 filed Mar. 6, 2007, the contents of which are hereby incorporated by reference in their entirety.

TECHNICAL FIELD

The invention relates to a controller for wireless communication with a peripheral unit.

BACKGROUND

In motor vehicles in particular, even today a large number of functions are triggered or controlled via remote controls. Usually a radio link in the license-free frequency bands is used for transmission from and to the motor vehicle. To gain access to the motor vehicle and also to start the engine for example what are known as "Remote Keyless Entry" systems (abbreviated to RKE systems) for wireless central locking are used. RKE systems have now become the standard solution not only for convenient locking and unlocking of a motor vehicle but also for other convenience functions. They operate by means of a radio control generally integrated into the vehicle key, which is additionally used, as well as for locking and unlocking the doors and the trunk, for activating or deactivating the burglar alarm and the immobilizer accordingly. Other functions such as convenient opening and closing of windows, sun roofs, sliding doors or hatchbacks can also be integrated into the system. A further convenience function and safety function is the activation of the front lighting of the motor vehicle. Additional safety is provided by a so-called emergency button integrated into the key which, when pressed, triggers an audible and visual alarm on the motor vehicle. Publication DE 102 33 597 A1 describes the functioning of such an RKE system and a method for warning about illegal attempts to access the vehicle.

Such RKE systems operate in such cases as required with unidirectional or bidirectional communication within the range of internationally enabled ISM frequencies. Further typical features are secure data transmission with optionally increased security by way of a challenge-response authentication method (bidirectional) and also low energy consumption. In addition further applications allow the functions of an RKE system to be personalized to selected persons. The operating range of such RKE systems is usually up to 100 m.

A further system based on radio communication is the so-called PASE system. PASE stands for PAsive Start and Entry and describes a keyless entry and start system. With this keyless vehicle entry system the driver only has to carry an identification transmitter (ID) with them and is given access to the vehicle simply by touching the door handle. As soon as the driver is inside the vehicle, the engine can be started by pressing a button. If the driver leaves the vehicle, the PASE system locks the vehicle either automatically or at the touch of a button. The drivers identification device replaces conventional mechanical or radio-controlled keys and is designed to give the driver maximum convenience and be very easy to use. Here too there is the option of personalization to selected persons and multi-channel bidirectional data transmission is usually used which is also undertaken wirelessly and encrypted, for example in the range of internationally enabled ISM frequencies.

There are also currently systems with other functions establishing themselves in the field of motor vehicles, such as the transmission of status information for example. Such systems generally operate over greater distances, usually several hundred meters. Examples of such systems are what is known as Telestart, i.e. starting an engine from long distances, or remote control of a static heater, an automatic climate control system and so forth. Further examples for the use of radio links with large ranges other than those of the RKE and PASE systems described relate to status information about the motor vehicle able to be called up from longer distances, such as the current status of its locks, the current internal temperature and the results of technical system checks (technology check). The transmission of alarm messages is also desirable over a longer distance.

All functions requiring wireless data transmission over longer distances are also grouped together under the generic term "long-range applications". An objective for long-range applications is to provide data transmission or communication respectively over distances of at least 600 m. Arrangements already available for long-range applications have thus for been predominantly "isolated" arrangements, which for various reasons have a separate control unit with corresponding identification (ID) and a separate controller in the motor vehicle.

To improve the operating convenience for the user there is great interest in implementing radio communication for RKE, PASE and long-range applications in just one single system. For the user this means that he would only use and need to carry with him one peripheral unit (e.g. mobile control unit, remote control) with which he can control all desired functions. At the same time it is useful as regards costs for only a single controller to have to be built in on the vehicle side which controls all the said functions.

It is also desirable for the vehicle-side controller to also be embodied for checking and testing the tire pressure, with the peripheral unit then being a tire pressure sensor. Arrangements for checking the tire pressure and typically known by names such as "Tire Guard" or TPMS (Tire Pressure Monitoring System). Tire Guard is a so-called direct tire pressure checking system in which battery-powered sensors attached to the wheels continuously measure the tire pressure. The coded information about the current tire pressure in this case is transmitted as a high frequency signal to the receiver and the corresponding data is evaluated by special software in a control unit and displayed on the dashboard. In such cases the sensors attached to the wheels of the motor vehicle likewise operate in license-free frequency bands (usually at 315 MHz and 433.92 MHz) and thus also in the frequency ranges used by RKE and PASE.

An integration of standard arrangements such as for example RKE, PASE, Tire Guard or TPMS arrangements, as well as the long-range applications into one system is desirable for various reasons. From the user's viewpoint this means for example that he only need carry with him one peripheral unit typically equipped as a mobile operating device, with which he can control all the said functions. On the other hand it is desirable in relation to costs for example to provide just a single controller which performs the vehicle-side wireless communication and control sequences for the said functions.

However in such cases different, sometimes conflicting demands made on the vehicle-side controller have to be fulfilled. These differing demands typically relate to the frequency band used in each case, the modulation method, the data transmission rate, the necessary bandwidth, the sensitivity of the receiver unit, the required transmit power and the respective antenna characteristics for transmitting and receiving the relevant signals.

SUMMARY

According to various embodiments, a control unit for wireless communication can be specified with at least one peripheral unit for different standard arrangements and/or long-range applications, in which the various requirements are largely met.

According to an embodiment, a controller for a motor vehicle for wireless communication with a peripheral unit with: at least one receiver unit for receiving radio signals for standard applications and at least one receiver unit for receiving radio signals for long-range applications which are emitted by the peripheral unit at different frequencies for the standard applications and the long-range applications; at least one antenna for one or both receiver units respectively; and a control unit for controlling the two receiver units and also for evaluating signals from the two receiver units, with each of the receiver units respectively being parts of a combined transceiver unit which is also embodied for transmitting signals to the peripheral unit.

According to a further embodiment, the receiver units may have different sensitivities, different received bandwidth, different data transmission rates and/or different demodulation methods. According to a further embodiment, two transceiver units may have different transmit frequencies, different transmit powers, different transmit bandwidth, different data transmission rates and/or different modulation methods. According to a further embodiment, each of the receiver units or transceiver units may be exclusively assigned to an antenna. According to a further embodiment, an antenna may be available by means of a coupler to both receiver units or transceiver units respectively. According to a further embodiment, the coupler can be a frequency divider which couples the two receive units or transceiver units respectively permanently to the antenna. According to a further embodiment, the coupler may be a changeover switch which optionally couples one of the two receiver units or transceiver units respectively to the antenna. According to a further embodiment, at least two antennas may be available by means of a switching matrix to a least one of the receiver units or transceiver units respectively. According to a further embodiment, the switching matrix can be an antenna diversity arrangement. According to a further embodiment, at least two antennas may be provided which differ in frequency curve, directional effect, size and/or mounting location. According to a further embodiment, the control unit can be coupled to peripheral function units. According to a further embodiment, the control unit can be coupled to the peripheral function units via an interface. According to a further embodiment, the interface can be a Serial Peripheral Interface. According to a further embodiment, the control unit can be implemented in a microcontroller. According to a further embodiment, the function units can be implemented in a microcontroller. According to a further embodiment, the transceiver units can be implemented in an application-specific integrated circuit. According to a further embodiment, the control unit can be implemented in an application-specific integrated circuit.

BRIEF DESCRIPTION OF THE DRAWINGS

The invention will be explained in greater detail below with reference to exemplary embodiments shown in the figures of the drawings, with the same elements having the same reference symbols. The figures show:

FIG. 1 a table with usual frequency ranges for standard and long-range applications;

DETAILED DESCRIPTION

Figure 2:
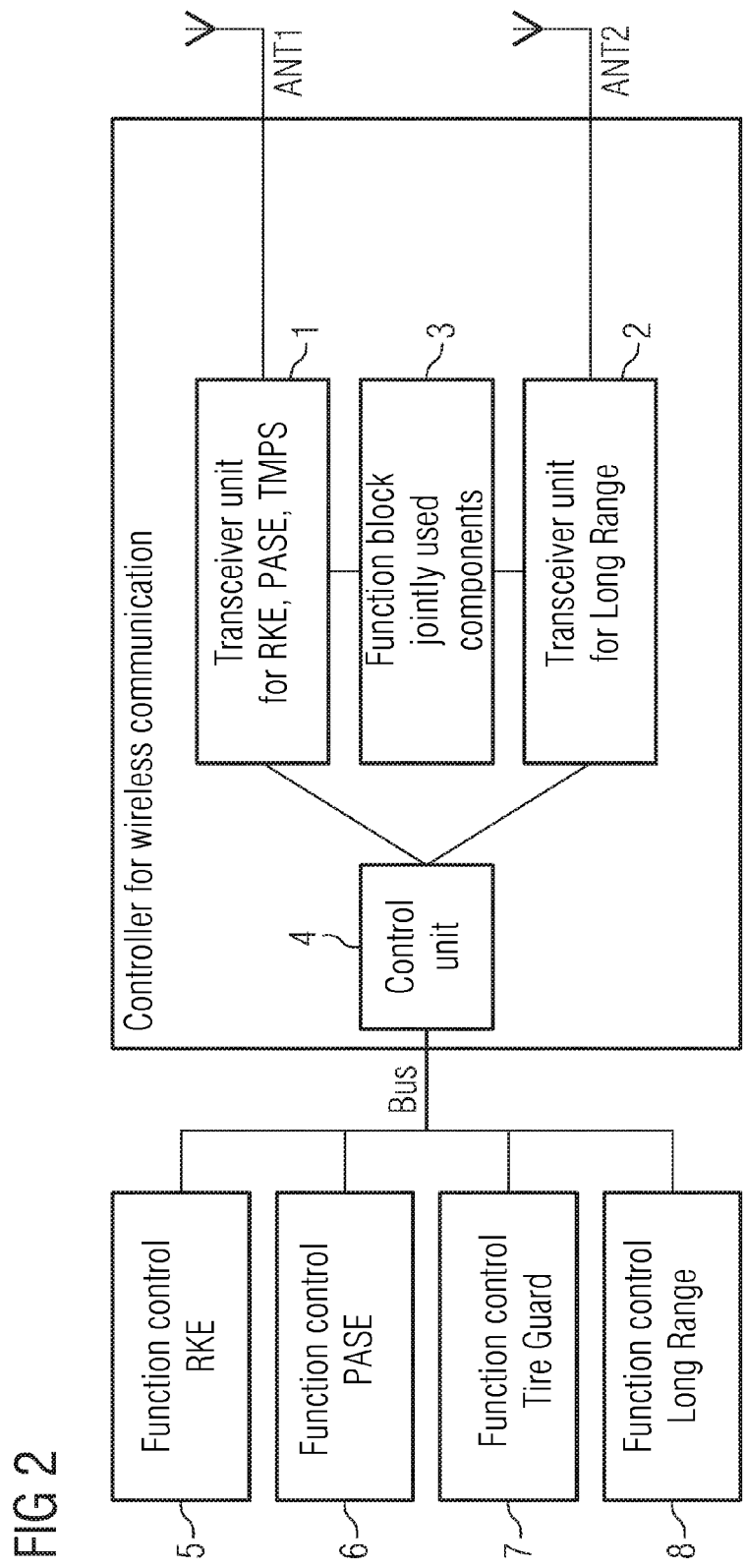
FIG. 2 a block diagram of an exemplary embodiment with exclusive antennas.

According to various embodiments, a controller for a motor vehicle for wireless communication may comprise at least one peripheral unit with at least one receiver unit to receive radio signals for standard applications and at least one receiver unit to receive radio signals for long-range applications, which are emitted by the peripheral unit at different frequencies for the standard applications and the long-range applications; with at least one antenna for one of the two receiver units respectively; and with a control unit for controlling the two receiver units as well as for evaluating signals from the two receiver units.

Conventional RKE, PASE and TPMS arrangements (standard) usually use frequency bands other than those employed for long-range arrangements. FIG. 1 shows a table which presents an overview of the frequency ranges used for standard arrangements (RKE, PASE, TPMS) and for long-range arrangements depending on geographical differences in requirements. Table 1 in this figure has 5 columns for the regions of Europe (EC), USA (US), Japan, Korea and China. Each column comprises two rows with the respective associated frequency ranges for the standard (RKE, PASE, TPMS) and long-range application areas. Also shown in Table 1 are the signal level ranges of the signals used belonging to the frequency bands depicted and where available the name of the associated standards or requirements respectively (for example ERC and FCC).

It can be seen from Table 1 that long-range applications such as mentioned above usually use frequency ranges and in addition also signal levels (permissible transmit power in dBm) other than is the case for standard services. Especially the permitted transmit power is higher with long-range applications (also necessary on account of the longer range desired) than is the case with standard applications (for example RKE, PASE, TPMS). Thus the standard applications have the desirable feature of being able to be implemented technically at lower cost than the long-range applications described.

Concerning the modulation of the transmitted signals, the aim of long-range applications is a narrow bandwidth, as is the case for example in the ARIB standard (ARIB STD-T67) for Japan, or Spread Spectrum methods are used, such as in the USA for example. The modulation used in such methods comprises ASK (Amplitude Shift Keying) and FSK (Frequency Shift Keying) for narrowband embodiments or Direct Sequence Spread Spectrum (PSK—Phase Shift Keying) or Frequency Hopping (FSK, OOK=On/Off Keying). By contrast typical RKE and PASE arrangements, Tire Guard or TPMS are restricted to Amplitude Shift Keying (ASK) and Frequency Shift Keying (FSK) with a large shift.

A further difference between standard applications and long-range applications lies in the data transmission rate typically used. In such cases low data transmission rates are used with long-range applications in order to achieve as high a sensitivity as possible. The data transmission rate for long-range applications is 1 kbit/sec for example. By contrast, with standard applications, such as RKE, PASE and TPMS or Tire Guard, higher data transmission rates are employed which are typically around 5 kbit/sec through 10 kbit/sec.

Furthermore long-range applications must be compatible in a few applications to use narrower channel bandwidths for transmit and receive signal, as is the case in accordance with the available frequency bands and the associated standards in a few regions. In such cases these channel bandwidths typically amount to 12.5 kHz for Korea, 25 kHz for Japan and 25 kHz for Europe, as can be seen from Table 1. Furthermore long-range applications must in a few cases be compatible with transmission regulations for Spread Spectrum signal transmission, as is applicable for the USA for example. In this case the usable bandwidth typically amounts to 600 kHz, whereby completely different demands arise for the realization of transceiver units and associated antennas for long-range applications. In the case of RKE and PASE applications as well the Tire Guard applications, bandwidths from 50 kHz to 300 kHz are usual for signal transmission and thus in their turn impose different types of demands on the technical implementation from those imposed by long-range applications.

Further marked differences between the arrangements for conventional standard applications and those for long-range applications lie in the required sensitivity of the receiver units. The sensitivity demanded for long-range applications in such cases lies in the range of less than −115 dBm, whereas the sensitivity necessary for RKE, PASE and also Tire Guard arrangements of the receiver units lies at around −105 dBm. In the case of the long-range applications or of the units used for them respectively, this requirement demands special circuitry such as especially low-noise preamplifiers for example. This increases the complexity of the arrangements and leads to higher costs.

In addition, for long-range applications on the one hand and standard applications on the other hand, differing demands are also imposed on the transmit power. The transmitter unit for long-range applications must be designed in such cases for transmit powers of at least +14 dBm, whereas the transmit powers for RKE, PASE and Tire Guard usually amount to far less than the permitted +10 dBm (namely typically −20 dBm).

Yet more clear differences between the arrangements for conventional standard applications and those for long-range applications emerge from the requirements imposed on the transmit and receive antennas, with once again the requirements in the area of long-range applications being far higher than those for RKE, PASE and Tire Guard. This leads to antenna diversity frequently being used for long-range applications. Antenna diversity refers to methods and systems in which a number of antennas are used per transmitter and receiver in order to reduce interference effects in radio transmission. This is especially necessary with mobile radio systems over longer distances, as in the case of long-range applications. If a number of antennas are now used as receive antennas for example, the probability is high that at least one of the antennas is located at a position which is not affected by a signal extinction. Accordingly a function is necessary in the receiver unit which recognizes which of the antennas is currently receiving the best signal and then uses its signal.

From the discussed differences in requirements for transceiver units for standard applications such as RKE, PASS and Tire Guard in relation to long-range applications, it can be deduced that for realization of radio transmission in standard applications the desired low-cost implementation is to the fore, whereas in the case of transceiver units for long-range applications a power-oriented design is required. This represents a basic problem area for the most flexible and low-cost integration of long-range applications and standard applications into a single wireless control unit and a single associated controller.

In addition there is the requirement for the highest possible scalability with such integration. Conventional basic vehicle equipment generally does not include any functions in the area of long-range applications, but it is desirable for such basic equipment to be able to be upgraded or retrofitted easily and at the lowest possible cost, to be able to continue to provide the user with just a single operating unit for wireless control of the motor vehicle.

With known integrated solutions the same frequency bands are often used for signal transmission for example for functions of the long-range applications and the standard applications. The transmit powers needed for long-range applications can thus not be implemented. The way to a solution in such cases lies in the fact that the existing transceiver units of the standard applications are merely optimized in the direction of higher sensitivities in the receiver unit. The ranges able to be obtained for such long-range applications in such cases typically lie at less than 100 m, whereas it is desirable to achieve ranges of at least 600 m.

Other known arrangements which integrate standard applications and long-range applications use different frequency bands for the two groups of services for this purpose. In such cases the transceiver unit in the vehicle-side controller is designed in respect of its capabilities (send power etc.) for long-range applications and used for both frequency bands. This approach to a solution, also known as dual-band operation, has the consequence however that wide-ranging compromises must be made in respect of the high-frequency characteristics or adaptations or switchovers. Such compromises have a negative effect above all on the desired capability of the integrated long-range applications. Furthermore the general conditions of dual-band operation of wireless remote controls also have a negative effect on the above-mentioned desired scalability of such arrangements.

In the present invention by contrast there is provision for the use of at least two separate transceiver units together with just a single control unit.

In this case one of the transceiver units can be oriented and optimized to the technical requirements of standard applications such as RKE, PASE and TPMS (Tire Guard) and another can be oriented and optimized to the technical requirements of long-range applications. In addition the vehicle-side controller can be implemented entirely or partly in a microcontroller with corresponding software or can be embodied as a state machine. The controller can be controlled in this case via just a single interface, via which both the function controls of the standard applications RKE, PASE and TPMS (Tire Guard) operate on the control unit, as do the function control(s) of the long-range applications. This is above all also useful if only a single antenna is used for the at least two transceiver units or if at least two transceiver units jointly use the same antenna(s), be it simultaneously or switchably.

The exemplary embodiments described below, for the sake of simplicity, always show the case of two separate transceiver units, with more than two transceiver units also always being possible. In the exemplary embodiment depicted in FIG. 2 a transceiver unit 1 and a transceiver unit 2 are provided. Furthermore the exemplary embodiment depicted in FIG. 2 includes a function block 3 for jointly used components as well as a control unit 4. So-called function controls are connected to the control unit 4 of the vehicle-side controller via data bus BUS. These function controls each comprise one function control 5 for keyless entry (Remote Keyless Entry) one function control 6 for PSE (PAssive Start and Entry), one function control 7 for Tire Guard and also one function control 8 for long-range applications.

In addition the control unit 4 is connected in accordance with FIG. 1 to both transceiver units 1 and 2. These transceiver units 1 and 2 are each connected to the function block 3. Each of the transceiver units 1 and 2 in such cases includes the complete transmit and receive path, meaning from the high-frequency part through to the data interface. The transceiver units 1 and 2 can use specific components jointly in this case, provided this is possible in respect of implementing the circuit technology and makes sense from a cost standpoint for example. Jointly-usable components can be quartz oscillators, voltage-controlled oscillators (VCO) or baseband components for example.

The transceiver unit 1 is designed to meet the requirements produced for the standard applications RKE, PASE and Tire Guard. In this case the transceiver unit 1 can be embodied as a pure receiver if the radio connection for RKE, PASE and Tire Guard for example is only to be unidirectional, i.e. when signals are only to be transmitted from the peripheral unit to the controller (such as in the Tire Guard tire pressure control system from the peripheral unit in the pressure sensor to the controller), but no signals are to be transferred to the (mobile) peripheral unit. The transceiver unit 2 is designed for the requirements which emerge for the operation of the long-range applications.

The control unit 4 controls both transceiver units 1 and 2. This especially relates to the activation of the transceiver unit 1 and/or the transceiver unit 2 and to the operating mode of these transceiver units, such as transmitting, receiving or polling for example. Furthermore the control unit includes functions relating to the choice of channel and setting transmitter or receiver-specific parameters respectively, such as transmit power, channel filter, type of modulation, data transmission rate and protocol formats. A further functionality of the control unit 4 concerns the evaluation of the properties of the respective signal received, such as RSSI (Received Signal Strength Indication), frequency fluctuations, cyclic redundancy checking (CRC) and similar for example. The control unit 4 can in this case be embodied by means of a software-controlled microcontroller or as a state machine.

In addition the control unit 4 controls the sequence of communication by transmitting so-called acknowledge signals and using ARQ (Automatic Repeat ReQuest) protocols. A further task of the control unit 4 consists of synchronization of the execution sequence of the different functions of the function controls 5 through 8, especially also their prioritization. Further functions of the control unit 4 consist of carrying out data editing for transmitting the signals (for example frame generation, multiple transmission and multi-channel operation) and receiving the signals (for example plausibility checking of the received data, error correction, association checking/ID and channel search). The vehicle-side controller for radio communication thus in general includes the tasks of the physical layer and the data link layer according to the OSI layer model. Deviations from these functionalities, be it a reduction of the scope for simplification or an expansion by specific features, are possible depending on the application.

The data to be sent or the data to be received respectively is transmitted by the control units 4 from or to the corresponding function controls 5 through 8 over the bus interface designated "BUS" in FIG. 2. In this case of the vehicle-side controller is a self-contained arrangement which is typically connected via an interface or data exchange connection widely used in motor vehicles, such as the LIN (Local Interconnect Network) bus or CAN (Controller Area Network) bus to the function controls 5 through 8. Other suitable bus connections can also be used. Depending on the embodiment, the function controls 5 through 8, as shown by examples in FIG. 2, can be control arrangements separate from each other, but for example can also be integrated individually or completely into the vehicle-side controller for radio communication.

Depending on the technical features of the implementation actually selected in each case and on the underlying requirements, the transceiver units 1 and 2 can be driven differently. One possible operating mode is an exclusive operation of the two transceiver units 1 and 2, meaning that at a specific point in time only one transceiver unit is ever active (transmitting and/or receiving). A further possible operating mode is a parallel operation of the two transceiver units 1 and 2 in receive mode (parallel receiving) meaning that the two transceiver units 1 and 2 can be in receive mode simultaneously, but not in transmit mode simultaneously however. Another possible operating mode is a parallel operation of the two transceiver unit's 1 and 2 in receive mode and transmit mode, meaning that the two transceiver units 1 and 2 can be simultaneously in receive mode and in transmit mode. Corresponding combinations and mixed forms of transmit mode and receive mode are likewise possible, especially if the arrangement of the vehicle-side controller comprises more than two transceiver units. The use of the common control unit 4 produces significant advantages in polling mode during parallel operation of the two transceiver units 1 and 2. Since the services RKE, TPMS (Tire Guard), PASE as well as long range can sometimes be available for polling at the same time and the information is simultaneously available, the system reaction time can be greatly reduced. The sequential polling of all channels can thus be dispensed with at least in part. At the same time this parallel operation also has an advantageous effect on the power balance (the power consumption) since the long overall receive time is replaced by short parallel receive processes. This markedly reduces the power consumption.

For the connection to and the assignment of transceiver antennas to the individual transceiver units, different embodiments are provided, of which examples are shown and explained in FIGS. 2 through 6. In this case FIGS. 3 through 6 once again comprise the components described above with reference to FIG. 2. In the exemplary embodiment depicted in FIG. 2 separate antennas ANT1 and ANT2 for the two transceiver unit's 1 and 2 are used, meaning that for each of the two transceiver units 1, 2 a separate antenna is exclusively available. In addition the term antenna also refers to such antennas which can be employed both for transmitting and also for receiving signals. An exclusive assignment of the antennas ANT1 and ANT2 to each of the transceiver units 1 and 2 of the vehicle-side controller makes it possible to optimize the antennas to the respective frequency range. In this case these antennas can be integrated into the controller for radio communication as so-called internal antennas or can be arranged as so-called external antennas outside the controller in the motor vehicle or for example on the bodywork of the motor vehicle.

For the arrangement shown in FIG. 2 with a transceiver unit 1 for standard applications (RKE, PASS, Tire Guard) and a transceiver unit 2 for a long-range applications, the antenna ANT1 for the transceiver unit 1 is preferably embodied as an internal antenna, which means that a small size can be achieved when the controller is built into the motor vehicle. The embodiment as internal antenna is also well suited to this purpose since for data transmission of the standard applications a high radio communication range does not have to be achieved as is the case with long-range applications. Thus the antenna ANT 2 for the transceiver unit 2 for operation of the long-range applications in the exemplary embodiment depicted in FIG. 2 is preferably embodied as an external antenna which in respect of size and placement in or on the motor vehicle brings about an improvement in the range.

Figure 3:
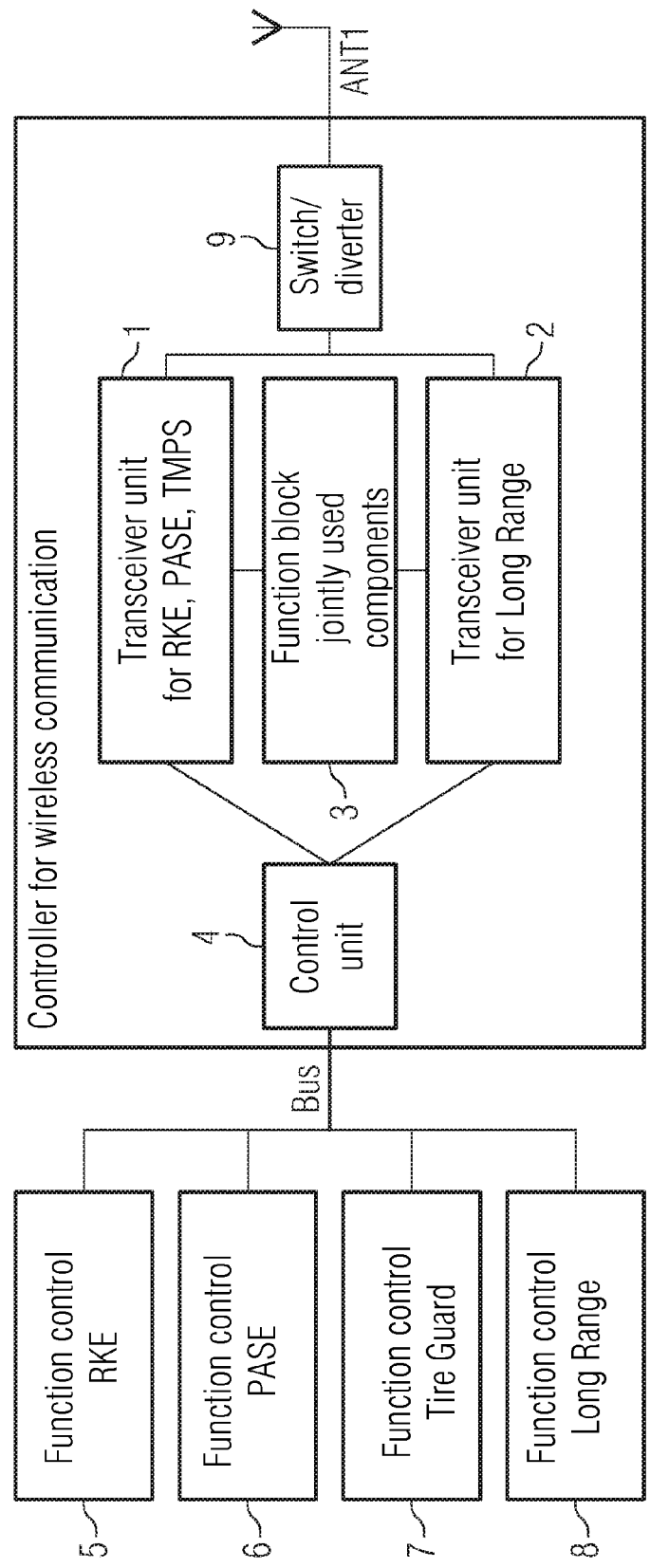
FIG. 3 a block diagram of an exemplary embodiment with switched shared antennas used alternately or in parallel.

FIG. 3 shows a controller with a common antenna ANT1 for the transceiver units 1 and 2. The antenna used ANT1 is designed in this case both for the frequency ranges of the standard applications (RKE, PASE, Tire Guard) and also for the frequency ranges which are used with the long-range applications. Such an antenna is normally also referred to as a dual-band antenna. The coupling of the antenna ANT1 to the transceiver units 1 and 2 and thereby the assignment to these units is undertaken via a coupler 9 which can be embodied as a changeover switch or as a frequency switch. If the coupler 9 is embodied as a changeover switch, the operating mode described above of exclusive operation of the two transceiver units 1 and 2 can be realized, i.e. at a specific point in time only one of the transceiver units 1 and 2 is ever active (transmitting and/or receiving) and connected to the antenna ANT1 With a coupler 9 embodied as a frequency divider on the other hand parallel mode of the two transceiver units 1 and 2 in receive mode or in receive and transmit mode can be realized with the single antenna ANT1. Corresponding combinations and mixed forms of transmit and receive mode are again also possible here if the arrangement of the vehicle-side controller includes more than two transceiver units 1 and 2.

Figure 4:
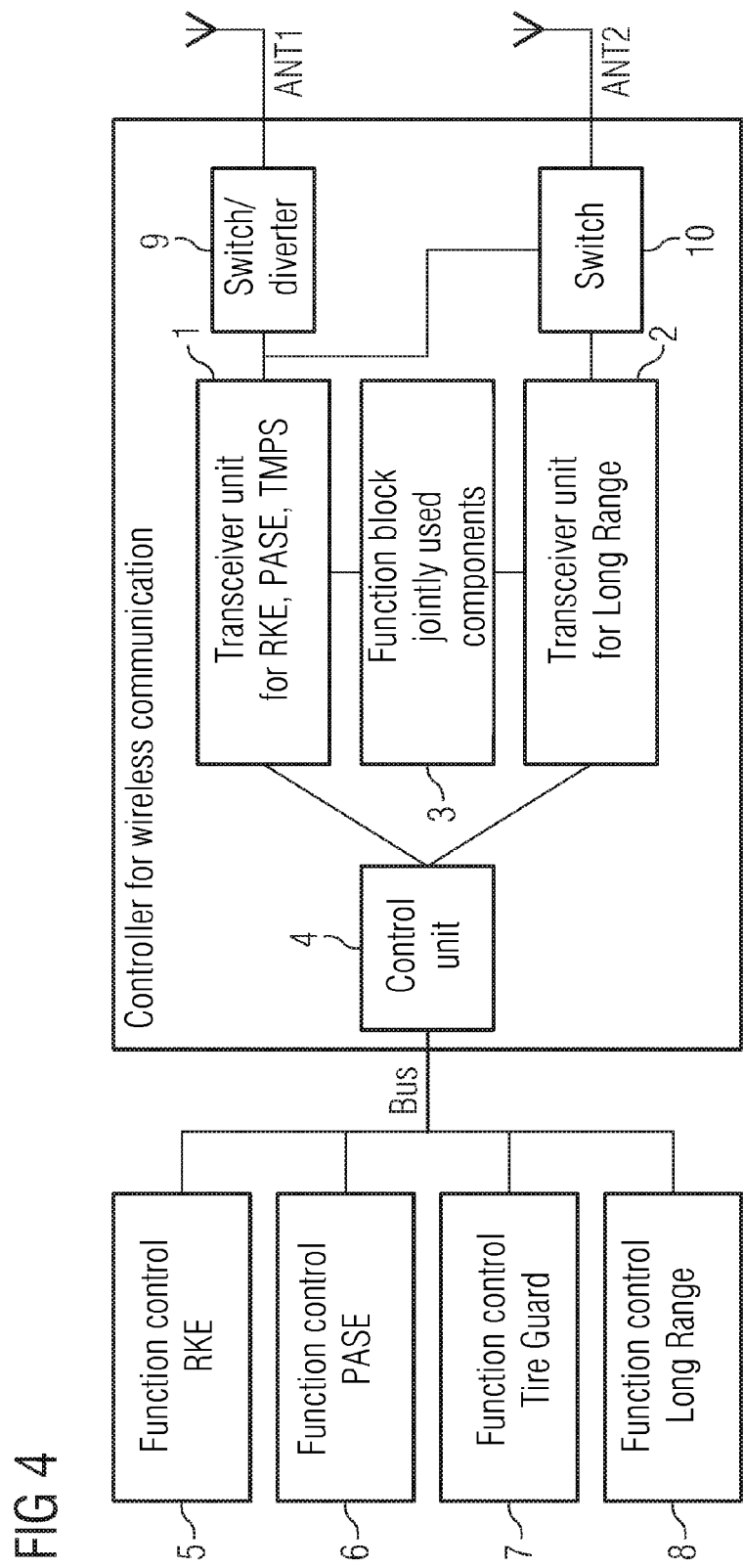
FIG. 4 a block diagram of an exemplary embodiment with switched shared antennas used exclusively, alternately or in parallel.

FIG. 4 shows a further exemplary embodiment of how the dual-band antenna ANT1 used jointly in FIG. 3 by the transceiver units 1 and 2 is used and additionally the second antenna ANT2 which is available exclusively for the transceiver unit 2 for operating the long-range applications. The connection of the antenna ANT1 to the transceiver unit's 1 and 2 and thus the assignment to these units is undertaken in its turn using the coupler 9. The connection of the antenna ANT2 to be transceiver unit 2 is undertaken in FIG. 4 by means of a switch 10 and is thus exclusively available to the transceiver unit 2. The switch 10 enables the transceiver unit 2 to be either assigned to the antenna ANT1 or the antenna ANT2. In this way a switched antenna diversity is made possible for the transceiver unit 2 for operating the long-range applications. The transceiver unit 2 selects via the switch 10 the relevant antenna with which under the given circumstances the best signal quality and range for long-range applications can be obtained.

Figure 5:
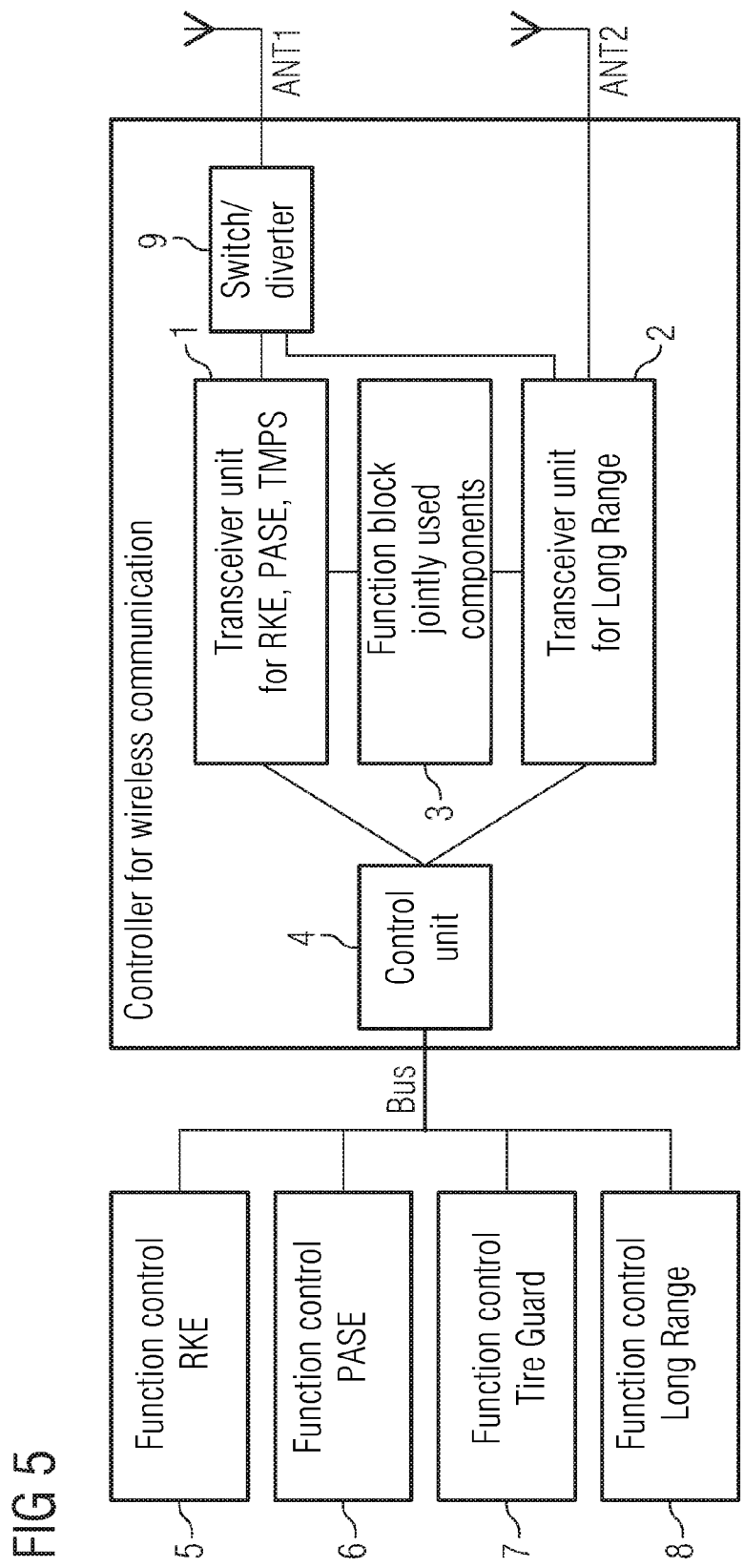
FIG. 5 a block diagram of an exemplary embodiment with simultaneous use of an exclusive and a switched shared antenna used alternately or in parallel along with it.

In the exemplary embodiment depicted in FIG. 5 the jointly used dual-band antenna ANT1 is used as in FIG. 4 by the transceiver unit 1 and 2 and additionally the second antenna ANT2 which is exclusively available to the transceiver unit 2 for long-range applications. The antenna ANT1 is once again connected to the transceiver units 1 and 2 and is thereby assigned to these units by the coupler 9. The antenna ANT2 is connected to the transceiver unit 2 directly however without a changeover switch or a frequency divider and thus continues to be exclusively available to the transceiver unit 2. For this purpose the transceiver unit 2 in FIG. 5 includes two high-frequency inputs for the simultaneous connection and use of the antennas ANT1 and ANT2. Thus the opportunity is produced for the transceiver unit 2 to use a simultaneous antenna diversity, meaning that the two independent signals of the antennas ANT1 and ANT2 can be used and evaluated simultaneously. If the coupler 9 is embodied as a frequency divider in this case, this simultaneous antenna diversity is possible at any time, since the signals of the antennas ANT1 and ANT2 are permanently available. If the coupler 9 is alternately embodied as a switch for switching over the signals of the antenna ANT1 to transceiver unit 1 or transceiver unit 2, the antenna diversity is only available for the transceiver unit 2 if the antenna ANT1 is not being used by the transceiver unit 1.

Figure 6:
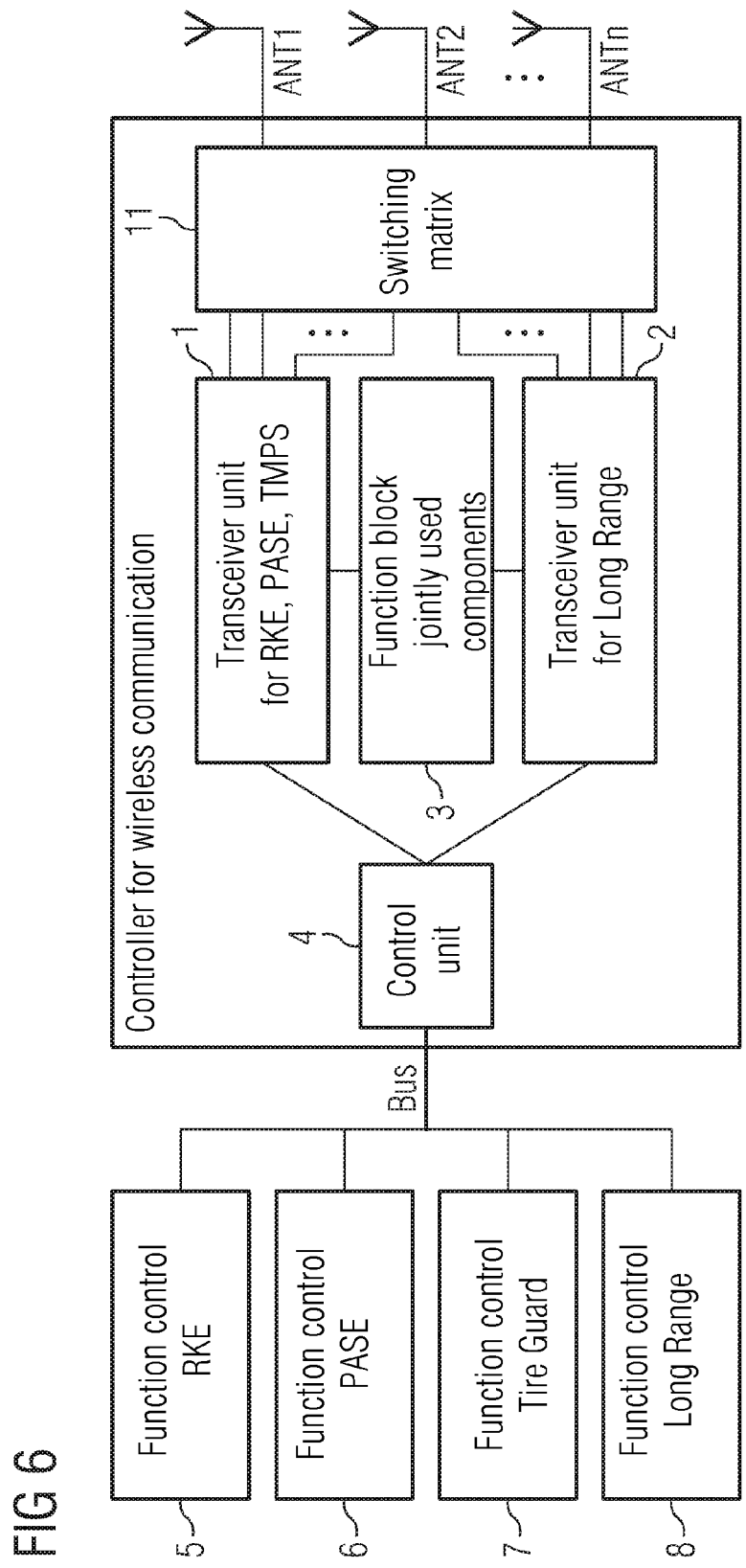
FIG. 6 a block diagram of an exemplary embodiment with a plurality of antennas able to be allocated via a switching matrix.

FIG. 6 shows an exemplary embodiment in which n antennas ANT1, ANT2 . . . ANTn can be connected in any given way via a switching matrix 11 to the transceiver units 1 and 2. Via this switching matrix 11 any given desired or optimum constellations respectively under the respective given transmit and receive conditions can be selected from the n antennas ANT1, ANT2 . . . ANTn for these standard applications RKE, PASE or Tire Guard respectively and the long-range applications (antenna diversity). In this case in accordance with this embodiment, antenna diversity can also be used for transceiver unit 1.

For the purposes of a clearer and simpler presentation, FIGS. 2 through 6 do not show any switches for switching between transmit and receive mode for the transceiver units 1 and 2. Furthermore in FIGS. 2 through 6 no distinction is made between the possible embodiments between integrated and external antennas, since the focus is on presenting the possible connections of the respective antennas used to the transceiver units. The embodiment of the described antennas as internal or external antennas can be freely selected in this case in accordance with the technical necessities, such as for example receive characteristics and transmit power or receive sensitivity and in accordance with the mounting conditions available for these antennas. As already described, further constellations of the antenna connection to the transceiver units, also for embodiments with more than two transceiver units, can be easily derived from the present examples in accordance with FIG. 2 through 6.

Figure 7:
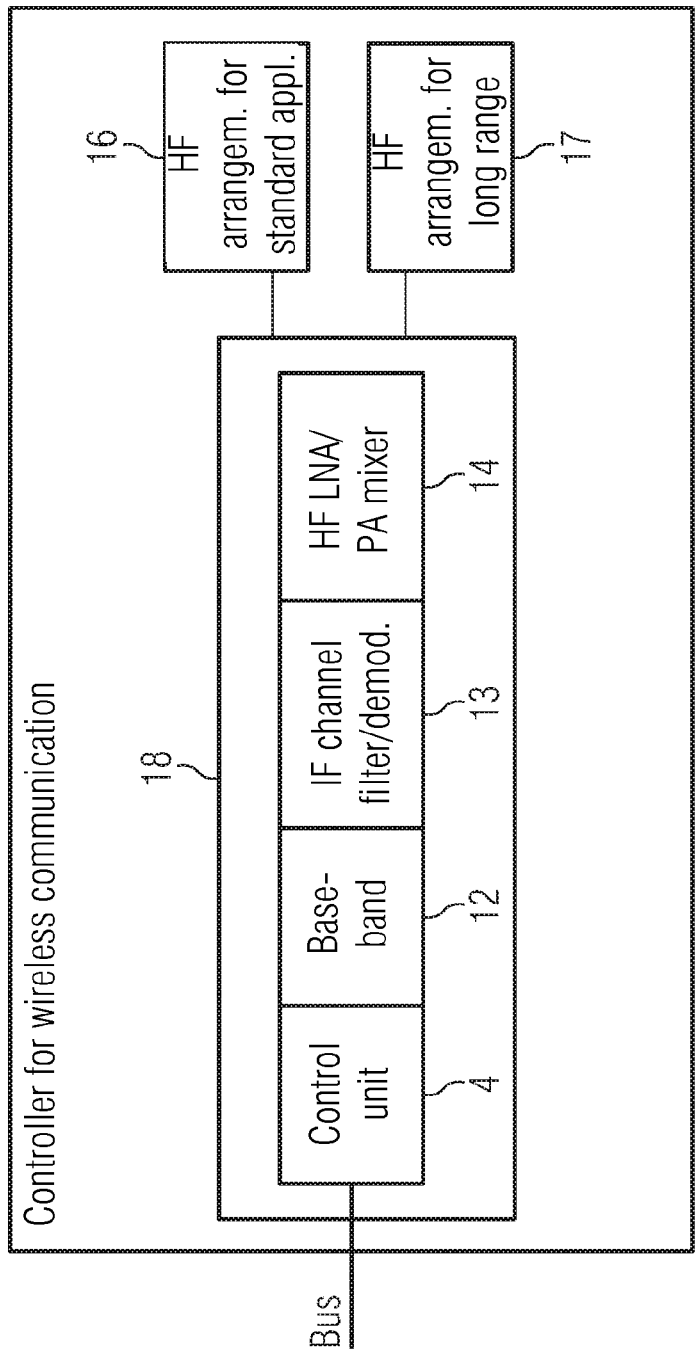
FIG. 7 a block diagram of a typical circuit arrangement for use in the exemplary embodiments depicted in FIGS. 2 through 6.

FIG. 7 shows a typical embodiment, in which the two transceiver units and the associated control unit are grouped together in an integrated circuit 18 (for example in an ASIC) In this case several if necessary associated high-frequency arrangements such as different input filters and/or amplifiers for example are embodied individually and externally. The high-frequency arrangements are accordingly the HF arrangement 16 for standard applications and the HF arrangement 17 for long-range applications. The integrated circuit 18 comprises the control unit 4 as well as the arrangements known from transmission technology and modulation or demodulation respectively of radio signals for the baseband 12 the intermediate frequency 13 (ZF channel filter, demodulation) and the high frequency 14 (HF LNA/PA mixer, with LNA standing for Low Noise Amplification and PA for Power Amplifier). The grouping together of these components of the transceiver units and the control unit into a single integrated circuit (e.g. into an ASIC) makes it possible to exploit the joint use of function components to the maximum and achieve a compact and low-cost realization of the vehicle-side controller for radio communication.

The transceiver units and the control unit can be embodied as a part of a more comprehensive control arrangement such as a body controller or a body control unit for example. Control arrangements which combine several functions in one housing are known as Body Control Units (BCUs). Depending on the vehicle architecture employed there are different embodiments of BCUs. Installed in the engine compartment, BCUs control headlights, flashers and the windscreen wiper-washer system for example. In the trunk of the motor vehicle BCUs are used example to control the rear lighting, the motor antenna, the rear screen wiper and the door closing aid. Central body control units also serve to bundle the control of the central locking system, the immobilizer, the air-conditioning system and the tire pressure monitoring into one arrangement. There are also BCUs for door and sliding sunroof functions. In such cases these BCUs are typically modular in structure, are thus easily scalable and allow a higher level of functional integration. Integrated into the electronic architecture of an overall motor vehicle, BCUs reduce the number of connectors and cable looms and simultaneously offer a very high level of reliability and cost effectiveness.

Figure 8:
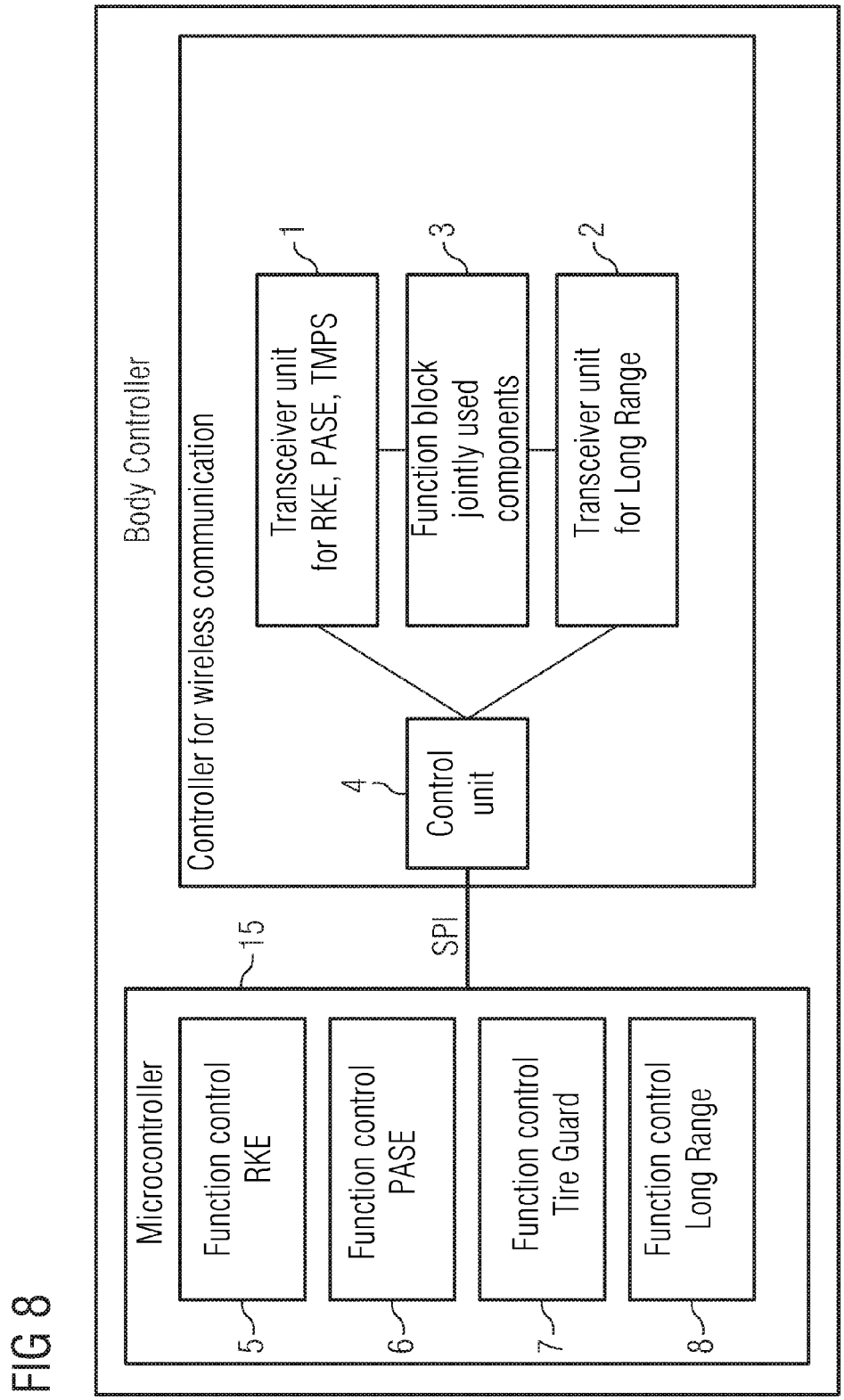
FIG. 8 a block diagram of an exemplary embodiment of a body controller with control circuit according to various embodiments.

FIG. 8 shows an exemplary embodiment of an integration of a control unit for radio communication into a body control unit, which is abbreviated here to body controller. The body controller includes, as already known from FIGS. 2 through 6, the control unit 4, the function block 3 for jointly-used components and the transceiver units 1 and 2. Furthermore the body controller also includes the function control 5 for RKE (Remote Keyless Entry), the function control 6 for PASE (PAssive Start and Entry), the function control 7 for Tire Guard (TPMS) as well as the function control 8 for Long Range. In this case the function controls 5 through 8, as shown in FIG. 8, can for example also be embodied combined in a microcontroller 15. In such a case the connection to the control unit 4 is undertaken via another bus interface which in the present case is embodied as a so-called SPI interface. The Serial Peripheral Interface (SPI) is used here for asynchronous serial communication between a host processor (here the microcontroller 15) and the peripheral chips (here the control unit 4).

Figure 9:
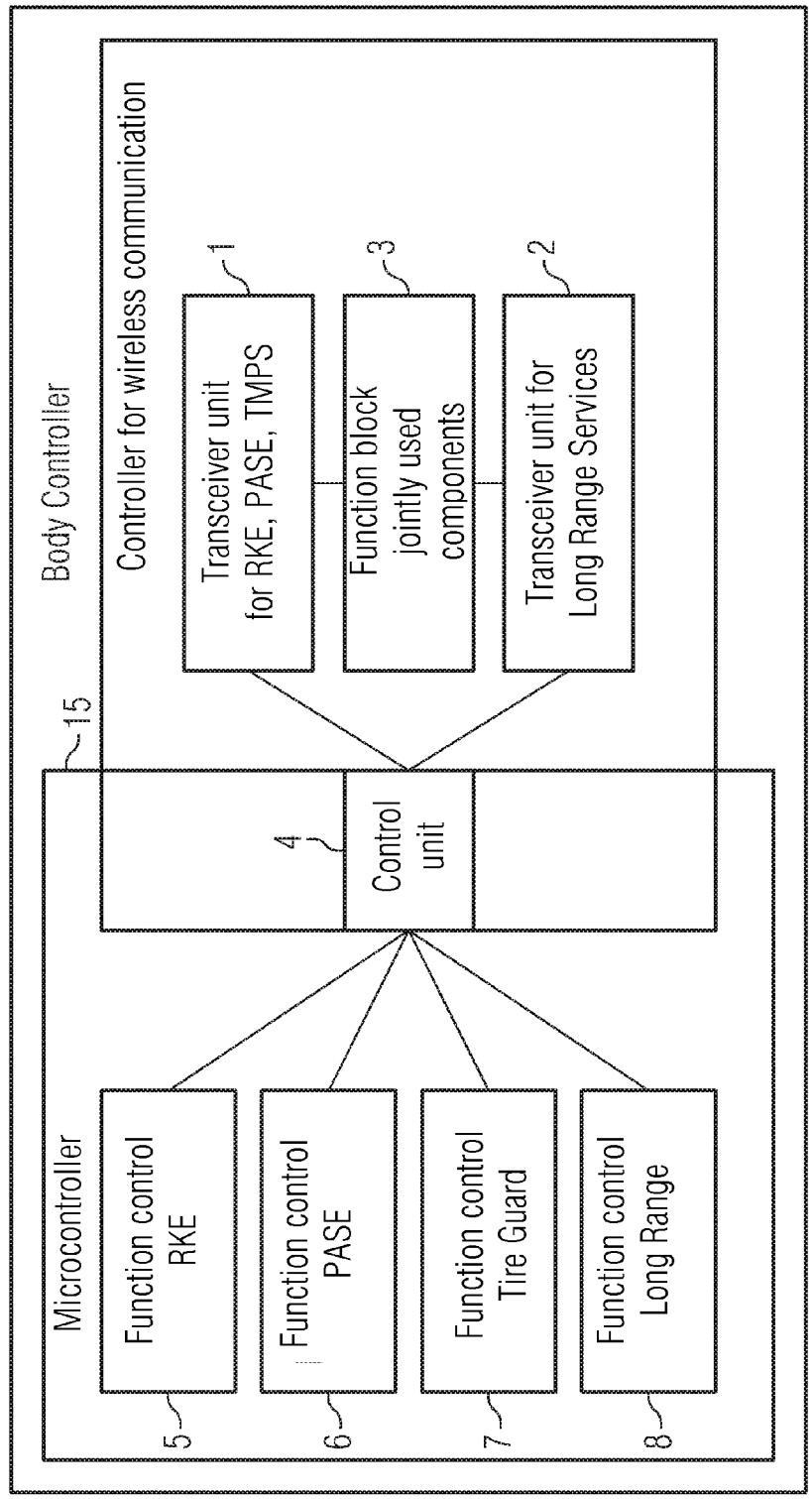
FIG. 9 a block diagram of an alternate exemplary embodiment for the body controller depicted in FIG. 8.

FIG. 9 shows a further example of the integration of the controller for radio communication into a body controller. Compared to FIG. 8 the control unit 4 is also implemented in the microcontroller 15 in the embodiment depicted in FIG. 9. The embodiments shown in FIGS. 8 and 9 allow a very flexible adaptation to the respective requirements even in a state of the controller when already built into the motor vehicle. By using a different software respectively in the microcontroller 15 modifications of the configurations and the control of the arrangement can also be undertaken in the built-in state in the motor vehicle. This can be necessary for example if subsequently further function components from the areas RKE, PASE, TPMS and long-range applications not yet implemented on delivery of the motor vehicle are to be realized.

Furthermore the embodiments shown are characterized by high flexibility in respect of the scalability of the vehicle-side controllers. For example, within the framework of equipping variants, depending on the application, transceiver units not needed or their associated components can be omitted and accordingly cost-optimized embodiments of the controllers made available. This means that the data transmission or communication respectively for standard applications such as RKE, PASE and TPMS (Tire Guard) as well as long-range applications are integrated scalably and at low-cost into a single, flexibly configurable controller.

The invention claimed is:

1. A controller for a motor vehicle for wireless communication with a peripheral unit, the controller comprising:
   a first transceiver unit for establishing radio signals communications with the peripheral unit for a standard, non-long-range application, the first transceiver unit comprising:
      a first receiver unit for receiving radio signals for the standard, non-long-range application emitted by the peripheral unit, and
      a first transmitter unit for transmitting radio signals for the standard non-long-range application to the peripheral unit,
   a second transceiver unit for establishing radio signals communications with the peripheral unit for a long-range application, the second transceiver unit comprising:
      a second receiver unit for receiving radio signals for the long-range application emitted by the peripheral unit at a different frequency than the standard, non-long-range application;
      a second transmitter unit for transmitting radio signals for the long-range application to the peripheral unit,
   wherein the radio signals communications with the peripheral unit for the standard, non-long-range application are independent from the radio signals communications with the peripheral unit for the long-range application;
   at least one antenna for one or both of the first and second receiver units respectively; and
   a control unit for controlling the first and second receiver units and also for evaluating signals from the first and second receiver units.

2. The controller according to claim 1, wherein the receiver units comprise at least one of different sensitivities, different received bandwidth, different data transmission rates and different demodulation methods.

3. The controller according to claim 2, wherein two transceiver units comprise at least one of different transmit frequencies, different transmit powers, different transmit bandwidth, different data transmission rates and different modulation methods.

4. The controller according to claim 1, wherein each of the receiver units or transceiver units is exclusively assigned to an antenna.

5. The controller according to claim 1, wherein an antenna is available by means of a coupler to both receiver units or transceiver units respectively.

6. The controller according to claim 5, wherein the coupler is a frequency divider which couples the two receive units or transceiver units respectively permanently to the antenna.

7. The controller according to claim 5, wherein the coupler is a changeover switch which optionally couples one of the two receiver units or transceiver units respectively to the antenna.

8. The controller according to claim 5, wherein at least two antennas are available by means of a switching matrix to a least one of the receiver units or transceiver units respectively.

9. The controller according to claim 5, wherein the coupler is an antenna diversity arrangement.

10. The controller according to claim 1, wherein at least two antennas are provided which differ in at least one of frequency curve, directional effect, size and mounting location.

11. The controller according to claim 1, wherein the control unit is coupled to peripheral function units.

12. The controller according to claim 11, wherein the control unit is coupled to the peripheral function units via an interface.

13. The controller according to claim 12, wherein the interface is a Serial Peripheral Interface.

14. The controller according to claim 1, wherein the control unit is implemented in a microcontroller.

15. The controller according to claim 11, wherein the function units are implemented in a microcontroller.

16. The controller according to claim 1, wherein the transceiver units are implemented in an application-specific integrated circuit.

17. The controller according to claim 1, wherein the control unit is implemented in an application-specific integrated circuit.

18. A method for a motor vehicle for wireless communication with a peripheral unit comprising the steps of:
using a first transceiver including a first receiver unit and a first transmitter unit, receiving radio signals from the peripheral unit for a standard, non-long-range application by the first receiver unit and transmitting radio signals to the peripheral unit for the standard, non-long-range application by the first transmitter unit,
using a second transceiver including a second receiver unit and a second transmitter unit, receiving radio signals for a long-range application by the second receiver unit and transmitting radio signals to the peripheral unit for the long-range application by the second transmitter unit, wherein the radio signals for both the standard, non-long-range application and the long-range application are emitted by the peripheral unit at different frequencies, and wherein the radio signals received from and transmitted to the peripheral unit are independent from the radio signals received from and transmitted to the peripheral unit for the long range application; wherein the radio signals for both the standard, non-long-range application and the long-range application are received by at least one antenna for one or both of the first and second receiver units respectively; and
controlling the first and second receiver units and evaluating signals from the first and second receiver units.

19. The method according to claim 18, wherein the receiver units have at least one of different sensitivities, different received bandwidth, different data transmission rates and different demodulation methods.

20. The method according to claim 19, wherein two transceiver units have at least one of different transmit frequencies, different transmit powers, different transmit bandwidth, different data transmission rates and different modulation methods.

21. The controller according to claim 1, comprising a plurality of receiver units for receiving radio signals for a plurality of standard, non-long-range applications emitted by the peripheral unit.

22. The controller according to claim 1, comprising a plurality of receiver units for receiving radio signals for a plurality of long-range applications emitted by the peripheral unit.

23. The controller according to claim 1, wherein the radio signals for the long-range application are defined by transmission parameters sufficient for communications over distances of at least 600 m.

24. The method according to claim 18, comprising receiving at a plurality of first receiver units a plurality of standard, non-long-range applications emitted by the peripheral unit.

25. The method according to claim 18, comprising receiving at a plurality of second receiver units a plurality of long-range applications emitted by the peripheral unit.

26. The method according to claim 18, wherein the radio signals for the long-range application are defined by transmission parameters sufficient for communications over distances of at least 600 m.

\* \* \* \* \*